United States Patent [19]

Thijssen et al.

[11] 4,188,797
[45] Feb. 19, 1980

[54] COUNTER CURRENT CRYSTALLIZER

[75] Inventors: Henricus A. C. Thijssen, Son; Bernardus G. M. van der Malen, Hagestein, both of Netherlands

[73] Assignee: Douwe Egberts Koninklijke Tabaksfabriek, Koffieliranderigen in Theehandel B.V., Utrecht, Netherlands

[21] Appl. No.: 866,169

[22] Filed: Dec. 30, 1977

[30] Foreign Application Priority Data

Jan. 12, 1977 [GB] United Kingdom ............... 1086/77

[51] Int. Cl.² ............................................. B01D 9/04
[52] U.S. Cl. ........................................ 62/123; 62/545
[58] Field of Search ................. 62/123, 124, 541, 544, 62/545

[56] References Cited

U.S. PATENT DOCUMENTS

| 3,103,792 | 9/1963 | Davids | 62/123 |
| 3,283,522 | 11/1966 | Ganiaris | 62/541 |
| 4,112,702 | 9/1978 | Smirnov et al. | 62/123 |

Primary Examiner—Ronald C. Capossela
Attorney, Agent, or Firm—Cushman, Darby & Cushman

[57] ABSTRACT

Improved apparatus for operating a continuous process for the freeze concentration of aqueous solutions, such as fruit juices, wine, beer, coffee extract and the like.

1 Claim, 14 Drawing Figures

DETAIL

DETAIL

COUNTER CURRENT CRYSTALLIZER

This invention relates to an improved apparatus for operating a continuous process for the freeze concentration of aqueous solutions, such as fruit juices, wine, beer, coffee extract and the like. The kind of processes with which the apparatus is concerned comprises passing the aqueous solution through a succession of disperate cooling zones, separating the ice crystals of each cooling zone from the liquid of that zone and passing these crystals to the preceding cooling zone, while recovering the liquid of the last cooling zone and feeding out the ice crystals of the first cooling zone.

A process and apparatus of this kind has been described in U.S. Pat. No. 3,283,522 (Ganiaris).

One object of the invention is to provide an apparatus, which is more economic, especially in scaling up, and which is easier to operate.

Another object of the invention in specific preferred embodiments is to avoid liquid vapour interfaces in operating the apparatus in order to avoid loss of volatile aroma constituents and contact with air.

Still another object of the invention in specific preferred embodiments is to minimize the quantity of wash water needed.

According to the invention there is provided an apparatus for the continuous freeze concentration of aqueous solutions comprising in combination:

(a) enclosure means defining a cylindrical crystallization zone;

(b) a rotatable axle coaxial with the crystallization zone mentioned under (a);

(c) a plurality of cooling trays within the crystallization zone mentioned under (a), distributed at preselected distances along the axle mentioned under (b), and substantially perpendicular to that axle, said cooling trays extending in radial direction from the inner wall of the enclosure means mentioned under (a) to the axle, such as to divide the crystallization zone, mentioned under (a) in a number of cooling compartments;

(d) wiper means, adapted to cooperate with and wipe the surface of the cooling trays, mentioned under (c);

(e) means to separate the ice crystals of each of the cooling compartments, mentioned under (c) from liquid in that compartment;

(f) means belonging to each cooling compartment to separate the ice crystals of the second and additional cooling compartments from liquid and pass said ice crystals to the preceding compartment;

(g) means to pass liquid obtained from the second to the penultimum separating means mentioned under (f) to the succeeding cooling compartment;

(h) means to separate the ice crystals of the first cooling compartment from the liquid and feed out said ice crystals;

(i) means to pass liquid obtained from the first separating means mentioned under (h) to the second cooling compartment;

(j) means to feed in the aqueous solution in the first cooling compartment;

(k) means to recover liquid obtained from the last separating means as a product.

When speaking of preceding and succeeding these terms are meant to refer to the cooling compartments in the sequence of concentration of dissolved solids in the liquid.

When speaking above of "cooling trays" a convenient embodiment will be flat plates, being hollow such as to contain and conduct a cooling medium, such as evaporating fluorinated hydrocarbons (freon).

The "wiper means" mentioned above will generally be scrapers, adapted to actually scrape the surface of the cooling trays; but wiper means at very close distance skirting along the surface of the cooling means without actually touching are not excluded.

The means mentioned above under (h) will preferably comprise a wash column, and the means mentioned under (f) will preferable comprise slurry thickeners. Conveniently the wash column and the slurry thickeners will be of a novel design according to the invention, the construction of both being based on the principle which now will be discussed.

According to this aspect of the invention there is provided an apparatus for the continuous thickening and as the case may be washing of an ice slurry, said apparatus being usable as the means mentioned above under (f) and (h), comprising in combination the following cooperating elements.

(a') enclosure means defining a cylindrical space;

(b') a rotatable axle coaxial with the enclosure means mentioned under a', said axle and said enclosure means defining together an annular cylindrical space;

(c') means to feed in the feed slurry to the space mentioned under (b');

(d') filter means in said space, adapted to drain fluid from the slurry whilst retaining ice crystals, present in that slurry;

(e') means, adapted to feed out the thickened slurry;

(f') means adapted to feed out the fluid drained out by the filter means mentioned under (c');

(g') means adapted to maintain a pressure difference between the feed in slurry and the drained out fluid such as to ensure a stream of fluid through the filter means;

(h') between the means mentioned under (c') and (e') mechanical means adapted to push a mass of ice crystals to the feed out for the thickened slurry mentioned under (e').

Normally the slurry thickener will also comprise separately or in combination:

(i') mechanical means between the filter means mentioned under (d') and the feed out means mentioned under (e') having the following functions providing a limited resistance to the passage of a mass of ice crystals and cooperating with the mechanical means mentioned under (h') in such a way as to compact the mass of ice crystals squeezing out liquid from between the separate ice crystals;

desintegrating the compacted mass of ice crystals such as to facilitate the passage of the particles obtained;

(j') vanes attached to the inside of the cylindrical enclosure means, mentioned under (a') adapted to avoid that the compacted means of ice crystals rotates along with the rotatable axle, the mechanical means mentioned under (h') or the mechanical means mentioned under (i').

The mechanical means mentioned under (h') may e.g. comprise tilted vanes distributed along the circumference and attached to the rotatable axle mentioned under (b'). Tilted vanes, as the case may be provided with a sharp edge, may also be used to desintegrate the compacted mass of ice crystals as mentioned under (i'). Preferably however, the means mentioned under (i')

will comprise a rotating disk with knives and slots as will be more fully disclosed below.

In order to help in the creation of a packed bed of crystals in the annular space it may be necessary to employ special means to avoid the mass to rotate along with the mechanical means, such as the tilted vanes, rotating with the rotatable axle. These means may consist of vanes attached to the inside of the cylindrical enclosure means, oriented radially and parallel to the axis of the enclosure means and preferably located at both sides of that part of the annular space which contains the filter means mentioned under (d'). According to a preferred embodiment of the invention the filter means mentioned under d' constitutes part of the enclosure means mentioned under (a'), which goes to say that the cylindrical wall is for a certain length perforated all around such as to constitute a filter adapted to drain away fluid in the slurry and retain the ice crystals. Preferably the dimensions of the apparatus have to be chosen such that the length of the packed bed, created in the annular space, mentioned under (b') is several times its width preferably between 7 and 15 times.

According to another embodiment of the invention the filter means mentioned under (d') consists of radially oriented pairs of filter surfaces, bridging the annular space, mentioned under (a'), the two filter surfaces of each pair being held apart by spacing means such as to create a narrow passageway for drained out fluid, that passageway being connected to the feed out means for the drained out fluid mentioned under (f').

The present invention will now be further described with reference to the accompanying drawings, in which.

Figure 1:
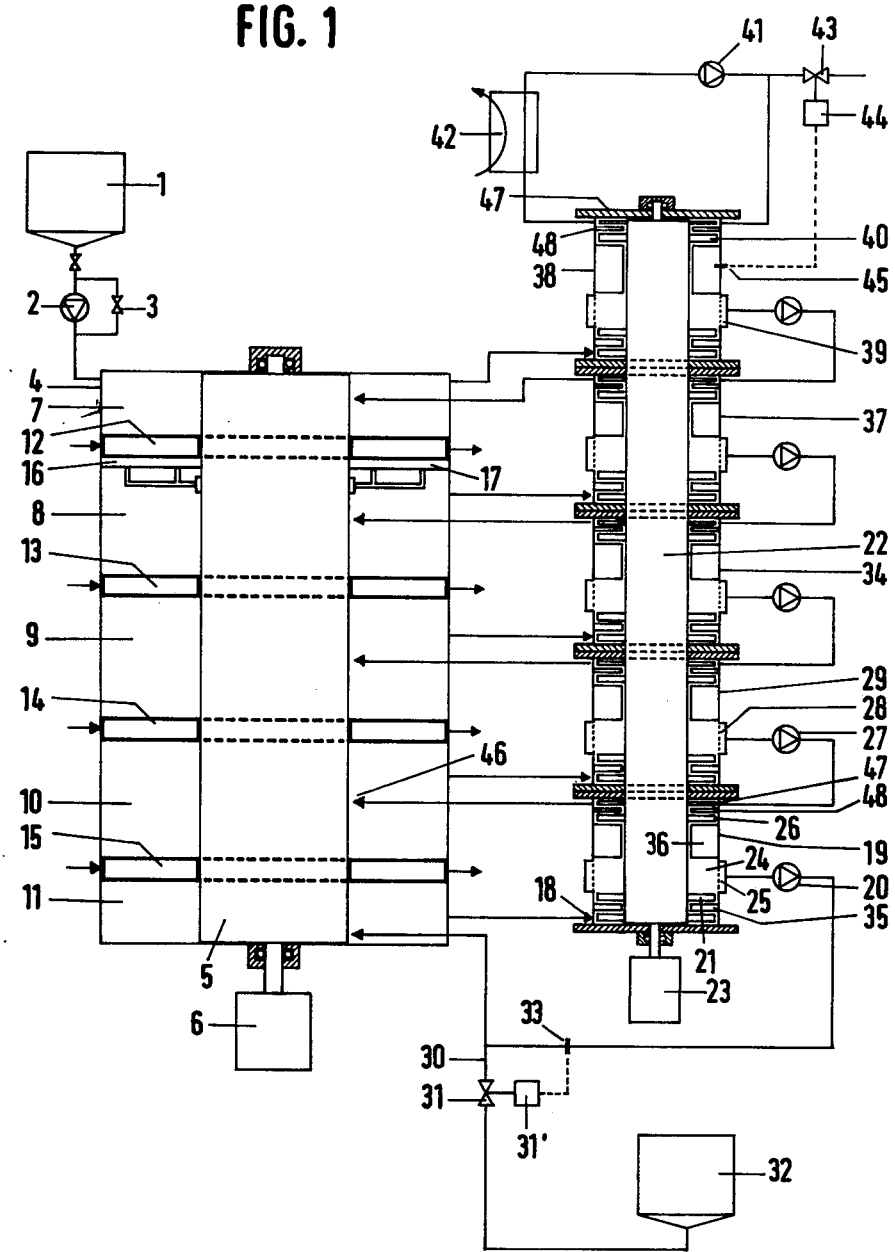
FIG. 1 is a schematical representation of the total set-up showing an embodiment in which at the left a stack of crystallizing compartments is shown, at the right a stack of slurry-thickeners, one being modified to serve as a wash column

An example of the apparatus according to an embodiment of the invention and the manner it operates will now be described. We refer to FIG. 1, which is a schematical representation of the total set-up.

At (1) a reservoir is shown containing the, as the case may be pre-chilled, liquid (such as fruit juice, coffee extract, wine and the like) to be freeze concentrated. The liquid is pumped by pump (2), shunted by the pressure valve (3), set to maintain a predetermined pressure in the first compartment of the crystallization vessel (4), provided with the axle (5), rotatable by the motor (6). The vessel (4) is divided into five compartments (7), (8), (9), (10), (11), by the cooling trays (12), (13), (14), (15), which are mounted on the cylindrical wall of the crystallization vessel (4) (in- and outlets of the cooling medium are indicated with arrows). Leakage from one compartment to the other along the slits between the rotating axle and the cooling trays may be prevented by conventional elastomeric rings (not shown).

For the sake of simplicity in this figure only two of the scraping means (16) and (17) are shown, which are attached to the axle (5). A suspension of ice crystals is sucked out of compartment (11) to the feed in (18) of the thickener (19) by the pump (20). At (21) tilted vanes, attached to the rotatable axle (22), actuated by the motor (23) are shown. In the annular space (24) a packed bed of thickened slurry is created. (It has to be remarked that preferably this annular space is narrower than is shown in the figure!) Liquid is drained away through the filter (25) by action of the pump (20). The packed bed is pushed upward and is finally desintegrated by the sharp edged tilted vanes (26). The broken up mass is flushed away by the liquid sucked away from the compartment (10) by the pump (27) through the filter (28) of the slurry thickener (29). The mixture of ice crystals from compartment (11) and liquid from compartment (10) is fed in compartment (10) at (46).

Liquid of compartment (11) is ultimately fed out at (30) through valve (31) to reservoir (32).

The valve (31) is actuated by the mechanism (31') which is controlled by the sensing device (33), sensing the temperature of this pumped liquid and thus also the temperature in compartment (11).

In the slurry thickener (19) the stationary vanes (35) and (36) are shown which, as mentioned above, help in creating a packed bed in the annular space.

Rotating pens (47) are shown which help to keep the crystals in suspension. Stationary pens (48) are attached to the inside of the cylinder.

The slurry thickeners (19), (29), (34) and (37) operate essentially in the same way. They and the thickener (38) which acts actually as a wash column are stacked together as shown and need only one axle (22). In this wash column (38) the ice has to be washed by water. As of course, dilution of the liquid in compartment (7) has to be avoided as much as possible the quantity of wash water has to be kept as small as possible. Hence, water may not penetrate to the filter (39). This also avoids water freezing on that filter, which would cause clogging.

The compacted mass of ice crystals after being broken up by the tilted vanes (40) is flushed away by water pumped by the pump (41) and partly or completely melted by passage through the melter (42). The quantity of water drained away is controlled by the valve (43), which is actuated by the mechanisms (44), acting on the sensing device (45). By measuring e.g. the temperature this device detects the concentration of the liquid surrounding the ice crystal at the point where it is located and keeps it substantially constant by controlling the valve (43). When the concentration, as indicated by the temperature of the liquid surrounding the ice crystals, is below a preselected value the valve (43) opens, when the concentration of the liquid surrounding the ice crystals is above a preselected value valve (43) closes.

Figure 2:
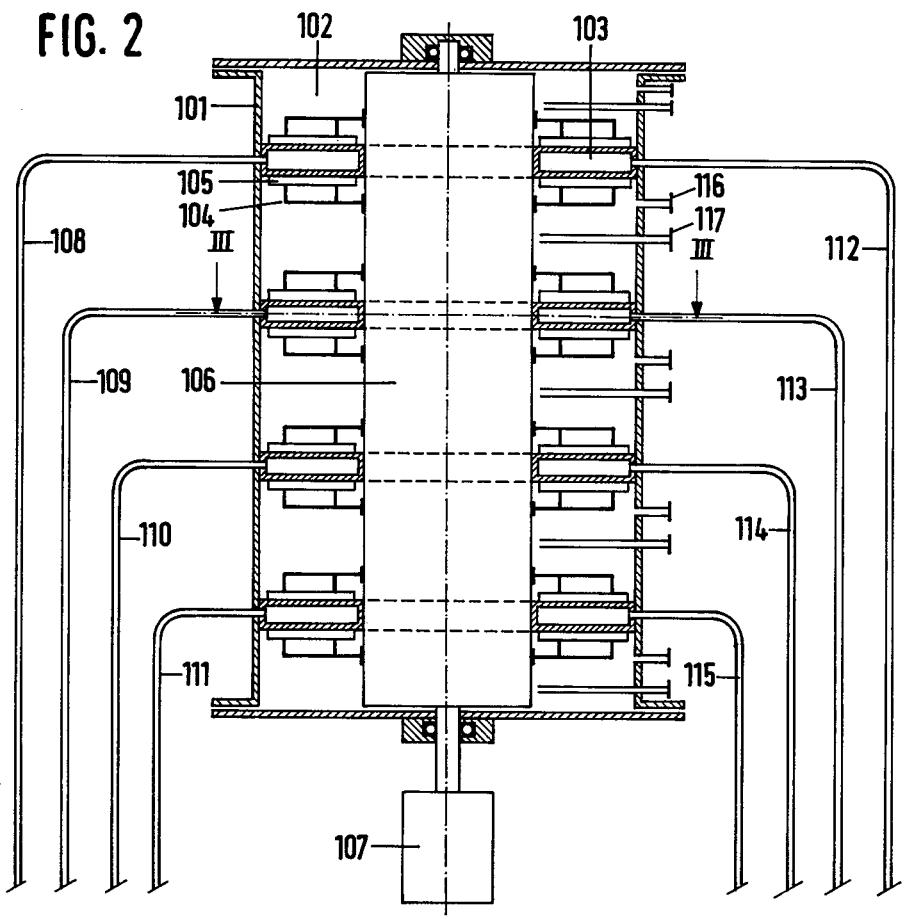
FIG. 2 is a compartimentalized crystallization vessel cut open lengthwise, in more detail

The compartimentalized crystallization vessel, denoted with (4) in FIG. 1 is shown in more detail in FIG. 2, cut open lengthwise.

At (101) we see the cylindrical vessel, divided in compartments (102) etc., separated by cooling trays (103) etc. The cooling trays are wiped by scrapers (104) etc., provided with the plastic flaps (105) etc. The scrapers are attached to the axle (106), actuated by the electric motor (107). Cooling medium is fed in at (108), (109), (110), (111) and fed out at (112), (113), (114), (115). At (116) a mixture of liquid and crystals is withdrawn from a compartment to the slurry thickener (not shown) belonging to that compartment, while at (117) a mixture is to introduced in that compartment, consisting of liquid from that compartment, liquid from the preceding compartments and crystals from the succeeding compartment, this mixture coming from the upper part of the next thickener (not shown).

Figure 3:
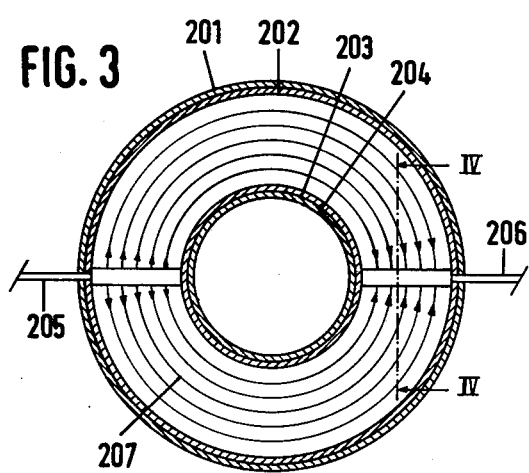
FIG. 3 is a cross-section along the line III—III in FIG. 2

FIG. 3 is a cross section along the line III—III in FIG. 2. At (201) is shown the cylindrical crystallization vessel, at (202) and (203) walls of the cooling tray, at (204) the hollow axle. Cooling medium is fed in at (205) and fed out at (206). The flow pattern of the cooling medium is denoted with (207).

Figure 4:
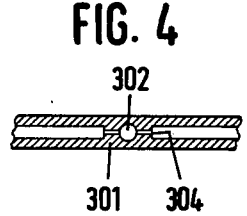
FIG. 4 is a cross-section along the line IV—IV in FIG. 3

FIG. 4 is a cross section of part of a cooling tray along the line IV—IV in FIG. 3. The metal walls are indicated with (301). The cooling medium is fed out (or fed in) at (302). The narrow slit (304) ensures an even distribution of the cooling medium.

An apparatus as shown in FIG. 1 may have in the case of a freeze concentration process a capacity of about 50 kg water removal per hour. The cooling trays (12) may have an outside diameter of about 525 mm and an inside diameter of about 224 mm. The thickness of these trays may be about 20 mm.

The crystallization compartments (8), (9), (10) may have a height of about 375 mm, and the compartments (7) and (11) may have a height of 250 mm. The total height of the crystallization vessel may be about 2 m.

The common axle (22) of the thickeners (19), (29), (34), (37), (38) may have a diameter of about 90 mm and the inner diameter of the cylindrical enclosure means (as denoted 401 in FIG. 5) may be about 120 mm. This results in an annular space of about 15 mm. The height between the filter means and the under flange may be about 50 mm, the height of the filter means about 40 mm, and the height of the stationary vanes about 20 mm, while the tilted vanes may have a height of 10 mm. The total height of one thickener may be about 160 mm, the flanges not included. The height of the stationary vanes above the filter means in thickener (38) may be about 150 mm. The total height of the stack of thickeners, inclusive flanges, may be about 1.20 m.

Figure 4A:
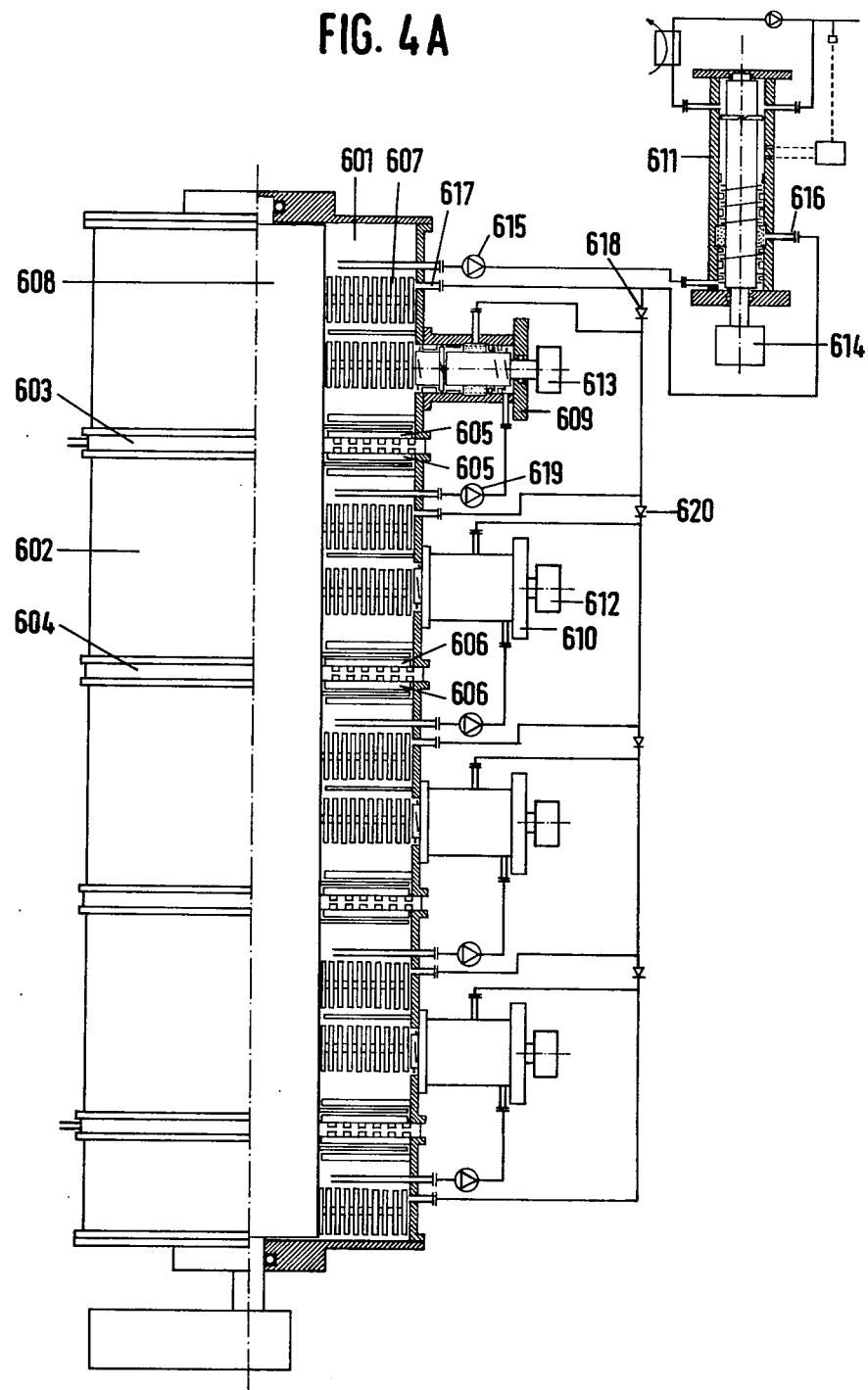
FIG. 4A is a preferred embodiment of the apparatus of the invention, partly cut open lengthwise, in which each slurry thickener is separatily attached to a crystallization compartment and has its own drive and a separate wash column is attached to the apparatus

In FIG. 4A a preferred embodiment of the invention is shown partly cut open lengthwise. The following remarks refer to the first and second compartment. At (601) we see the first compartment which is fed with the solution to be freeze concentrated, in the same way as in FIG. 1 (feed in not shown here), and at (602) we see the second compartment. Cooling trays, as already described are indicated with (603) and (604); scrapers, as already described in FIG. 1 are shown at (605) and (606). Moreover the compartments are provided with stirring means, one of which is indicated with (607). These stirring means consist of rods, attached to the main axle (608), provided with vanes.

The slurry thickeners (609) and (610) are directly attached to the main body of the apparatus. The wash column for the separation of the ice crystals from the first compartment (601) is shown at (611). The slurry thickeners and the wash column are separately actuated by the motors (612), (613) and (614). They will be described in more detail further on.

A slurry of ice crystals and liquid is pumped by the pump (615) to the wash column (611), functioning in essentially the same manner as already described for the embodiment shown in FIG. 1. The liquid, leaving the wash column at (616) reenters the compartment (601) at (617). Part of the liquid passes on to the second compartment through the pressure valve (618). The slurry of compartment (602) is fed to the slurry thickener (609) by the pump (619) and the liquid is recirculated to the same compartment (602) as already described for the compartment (601). Again part of the recirculated liquid is passed on to the next compartment to which purpose the pressure valve (620) serves.

Figure 5:
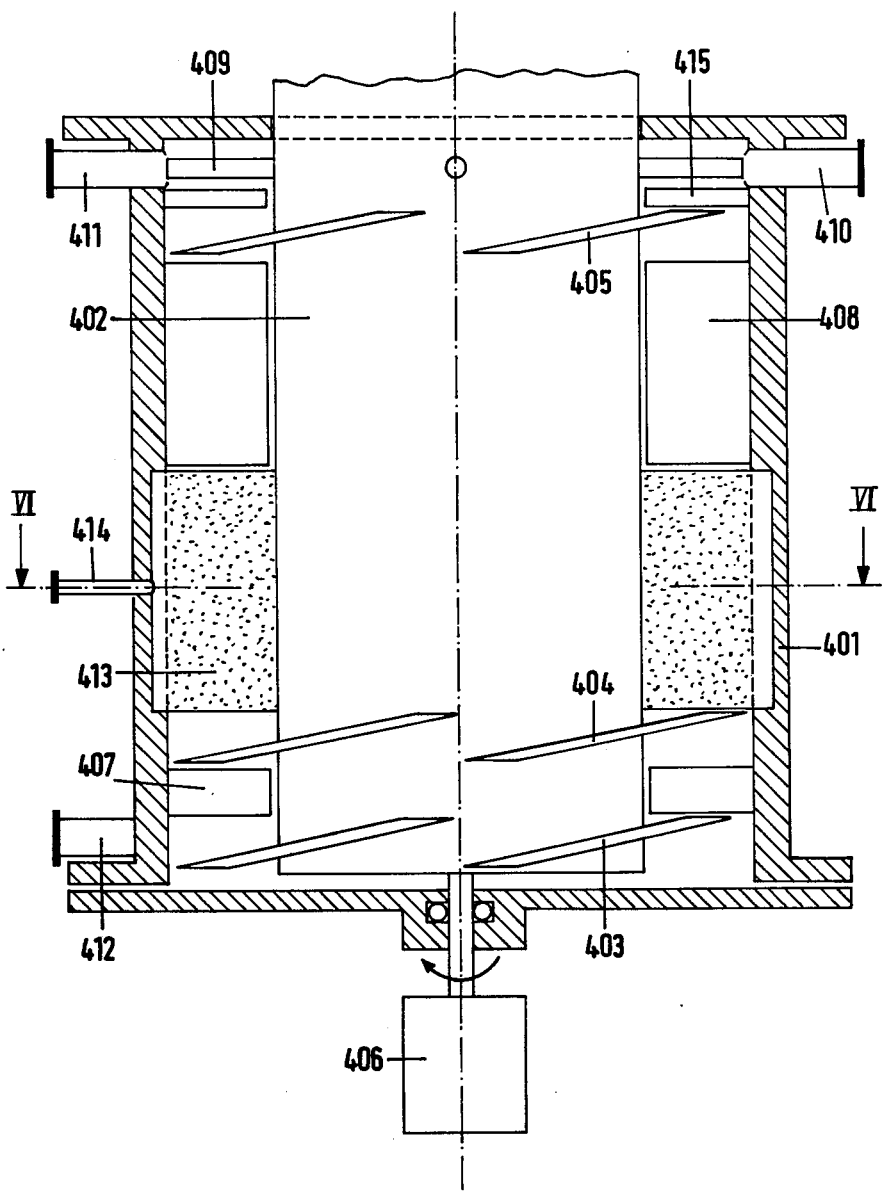
FIG. 5 is a slurry thickener cut open lengthwise as corresponds with (19) in FIG. 1

In FIG. 5 a slurry thickener is shown (see (19) in FIG. 1), cut open lengthwise. (At (401) we see the cylindrical enclosure means, at (402) a side view of the axle, at (403) and (404) tilted vanes, attached to the axle and having the function to push the crystal mass upward. At (405) there are likewise shown tilted vanes having the function to cut, break up and forward the crystal mass. The axle (402) is actuated by the motor (406). At (407) and (408) are shown stationary vanes attached to the inside of the cylinder (401). Pens (409) attached to the axle help in keeping the crystals in suspension. At (415) pens attached to the inside of the cylinder (401) are shown. (At (410) is shown the feed in for the liquid from the preceding crystallizing compartment and at (411) the feed out of the mixture of liquid from the preceding crystallizing compartment, the same crystallizing compartment, and crystals from the succeeding compartment. At (412) we see the feed in for the mixture of crystals and liquid, at (413) the filter retaining the crystals and at (414) the feed out for the liquid drained from the crystals between the filter (413) and the axle (402).

Figure 6:
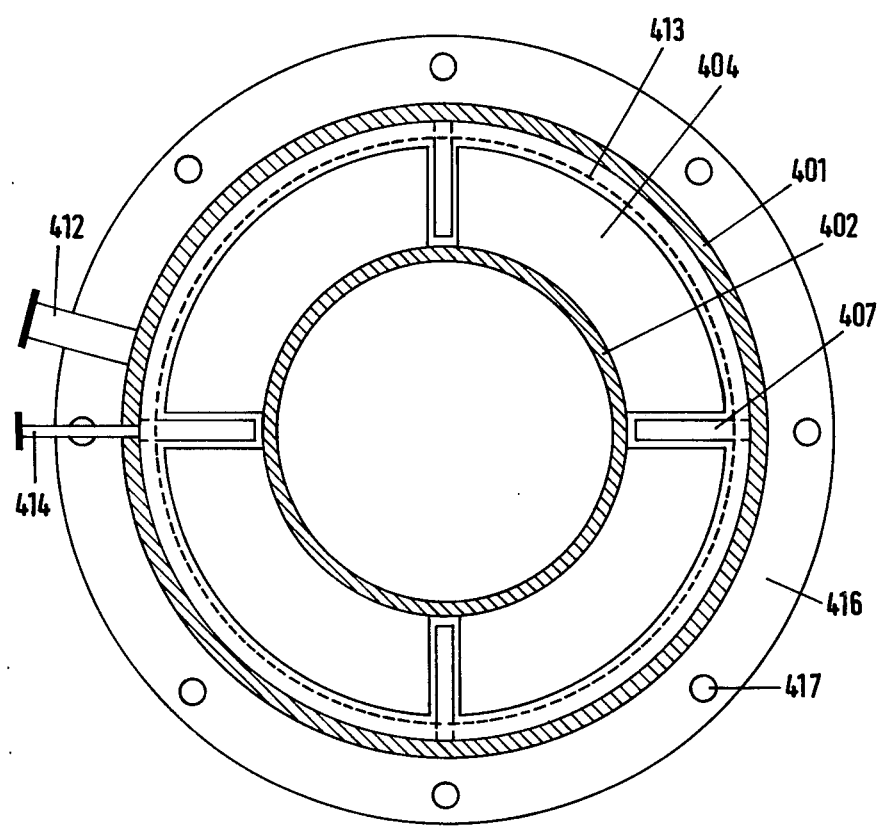
FIG. 6 is a cross-section according the line VI—VI of FIG. 5

FIG. 6 is a cross section according the line VI—VI in FIG. 5. Again the cylindrical hull is shown at (401), the hollow axle at (402), tilted vanes at (404), stationary vanes at (407), the filter at (413), the feed in for crystals and liquid at (412), the feed out for the drained out liquid at (414). At (416) we see the flange with holes (417) to fix the hull to the bottom of the slurry thickener.

Figure 6A:
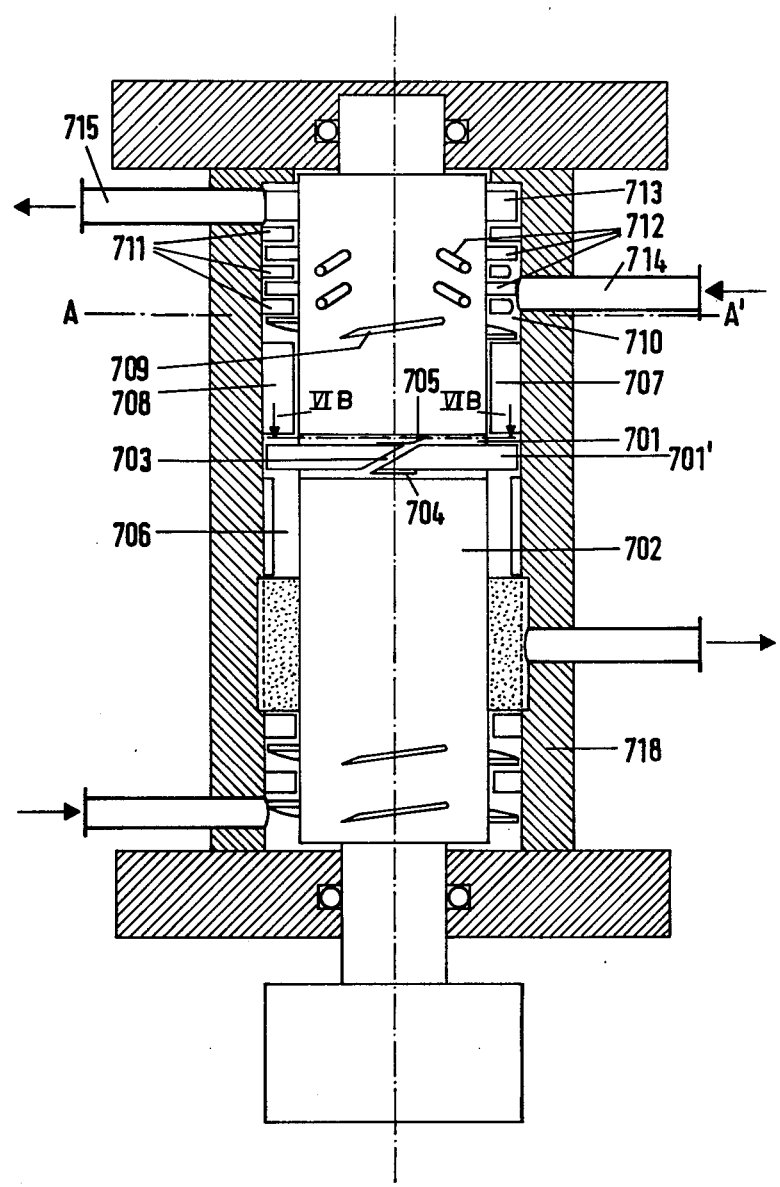
FIGS. 6A, 6B and 6C are representations of a preferred embodiment of a slurry thickener
Figure 6B:
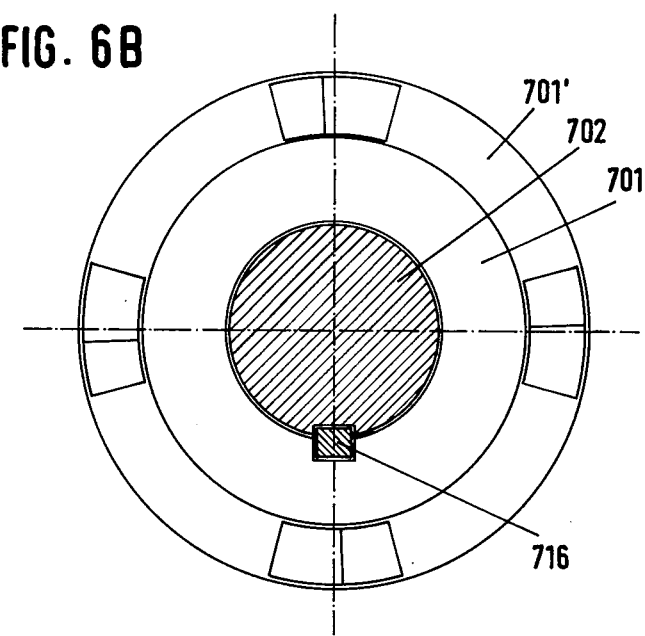
Figure 6C:
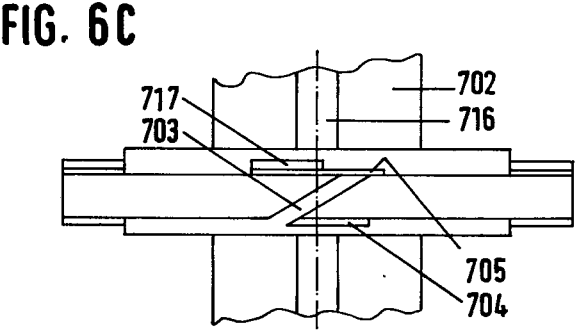

In the FIGS. 6A, 6B and 6C a preferred embodiment of the slurry thickener is shown. In FIG. 6A the slurry thickener is cut open lengthwise, in the same way as in FIG. 5.

The axle (702) consists of an inner core (which will be shown in FIG. 6B), surrounded by rings one on top of the other. For reasons of clarity the dividing lines between the rings are only shown for the ring (701) which will be described below.

The differences with FIG. 5 are to be seen in the upper part of the figure. At (701) we see a ring attached to an axle which will be shown in FIG. 6B as (702), and a disk (701') forming part with that ring, provided with slanted slots (703). This disk (701') fits snugly in the hull (718) of the slurry thickener. The number of slots may vary, e.g. from 1 to 4 and is dependent on the quantity of ice which has to be handled per time unit. Each slot is at the side of the filter provided with a knife (704). At the other side the slots are closed by springy tin metallic strips (705). When the axle (702) with the disk (701) is rotated (seen from above clockwise) the mass of ice crystals, compacted in the annular space (706) is desintegrated. The metallic strips (705) are lifted when the pressure exceeds a predetermined value and the desintegrated mass passes through the slots (703).

The ice crystals are now further forwarded in the annular space (707), provided with stationary vanes (708). At (709) are shown tilted vanes (as also already described with their function in FIG. 5). In the annular space (707) transport will cause a certain renewed compaction and the mass will be loosened by the tilted vanes (709). The loosened crystal mass passes now in the 'mixing compartment' (710) provided with stationary pins (711) and pins (712) attached to the rotating axle (702). The vanes (713), tangentially mounted to the axle (702) help in forwarding the ice crystals, now mixed with liquid entering at (714), into the outlet (715).

The stationary vanes (708) have the following function. They serve to avoid that the desintegrated mass of ice passing through the slots (703) rotate along with the disc (701'). The ice would accumulate above that disc (701') and prevent the metallic strip (705) from opening. The vanes (708) thus to say sweep the disc (701') and the ice will be transported in axial direction. The vanes (708) will preferably be relatively long to prevent liquid entering at (714) to enter the annular space (706) by leakage between the disc (701') and the hull (718).

Now coming back to FIG. 4A it can be said that the slurry thickeners (609) and (610) have the construction of the thickener just described and shown in FIG. 6A, with the exception that the upper part (the mixing compartment), which goes to say the part above the line A A' is superfluous. The part below that line is directly attached to the compartments (601) and (602) by flanges.

FIG. 6B shows a top view of a cross section taken along the line VIB—VIB, in FIG. 6A while FIG. 6C shows the ring denoted with (701) in FIG. 6A in side view and more in detail. At (702) we see the axle around which rings are disposed one on top of the other. The rings rotate along with the axle (702) by the key (716). The ring (701) carries the disc (701') as already said. One slot is to be seen at (703), one knife at (704), the springy metallic strip at (705), this last being attached to the disc (701') by a bolted block (717).

Figure 7:
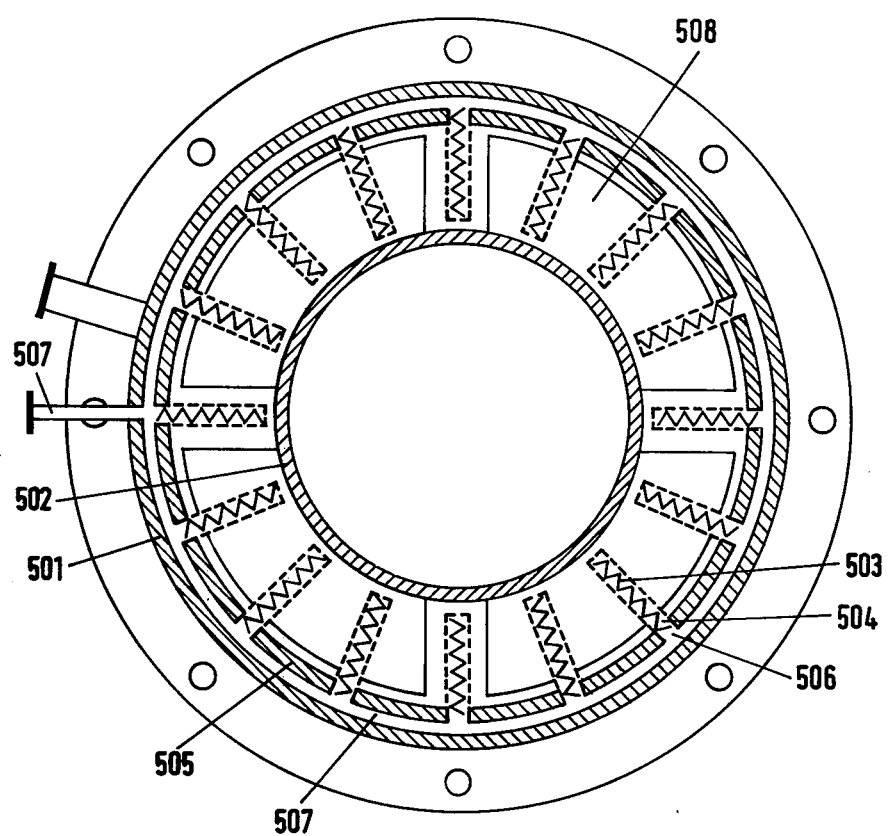
FIG. 7 is a cross-section clarifying another embodiment of the means for separating crystals and liquid to be used in a slurry thickener-washer.

In FIG. 7 the construction is clarified for an embodiment of the invention whereby the filter means consist of radially oriented pairs of filter surfaces, bridging the annular space between the cylindrical hull and the axle. Here again a cross section is shown perpendicular to the long axis of a thickener-washer.

At (501) we see the cylindrical hull, at (502) the hollow axle, at (503) the pairs of filter surfaces, held apart by the corrugated gauze (504). A cylindrical wall (505), with slits (506) creates a narrow annular space (507), communicating with the spaces between the pairs of filter surfaces (503) and with the feed out (507) for the drained out liquid. At (508) we see the tilted vanes attached to the hollow axle (502).

Figure 8:
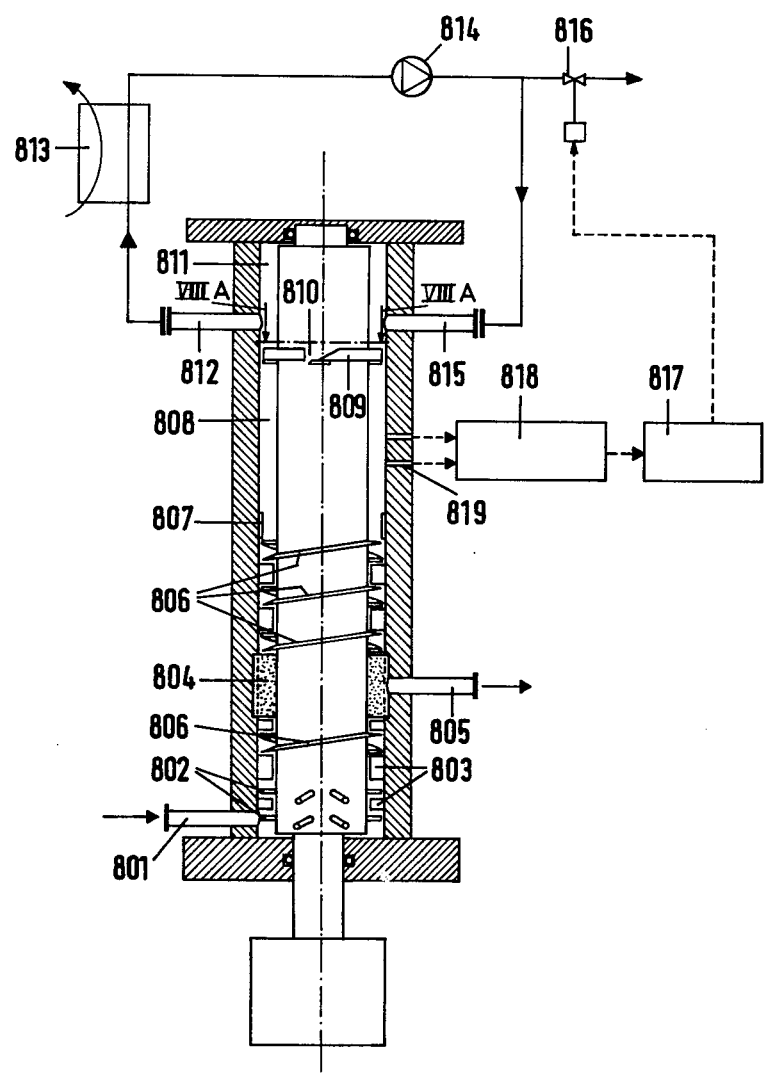
FIGS. 8, 8A and 8B show the wash-column of FIG. 4A in more detail.

In FIG. 8 the wash column (611) of FIG. 4A is shown in more detail.

The slurry enters at (801). Pins, rotating with the axle are shown at (802); stationary vanes at (803). The filter is denoted with (804). The liquid, passing through the filter leaves at (805). Tilted vanes are shown at (806). At (807) small stationary vanes are shown.

The annular space (808) is appreciably longer than in the slurry thickener as described in FIG. 6A.

Figure 8A:
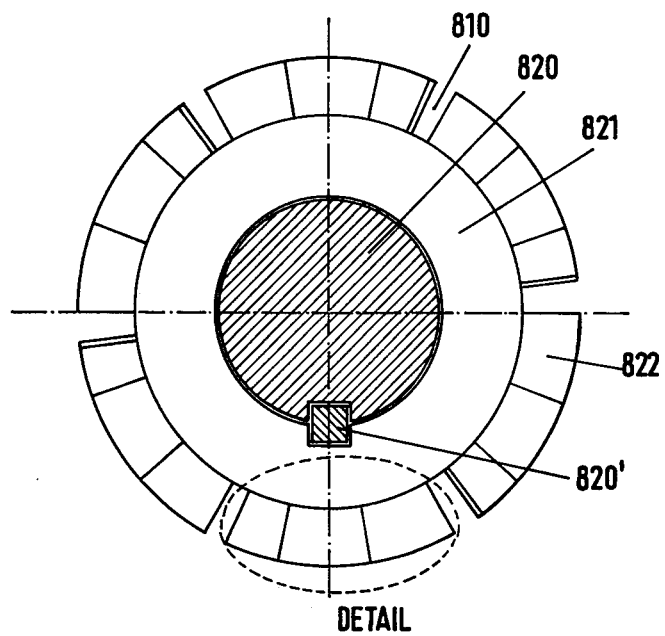
Figure 8B:
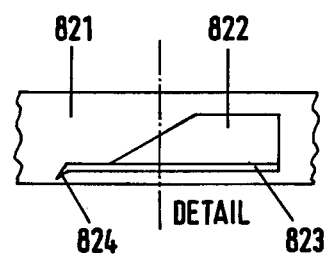

The cutting device which will presently be described in FIGS. 8A and 8B more in detail is to be seen at (809).

Somewhere between the small stationary vanes (807) and the cutting device (809) a wash front has to be formed between washwater and the liquid which has to be washed out between the ice crystals.

The reason that the annular space (808) is relatively long is to be found in the necessity to allow for some tolerance for the position of the wash front.

The ice passes through the slots (810) into the annular space (811), and is slushed away at (812) through the melter (813). The pump (814) will recirculate most of the water back to (815), for the slushing away of the ice as just described. A quantity of water corresponding to the ice fed in at (801) will be removed through the valve (816), governed by the control unit (817), which is fed by the converter (818). The converter gets signals from the temperature sensing devices (819) e.g. thermocouples. As well known the temperature at which the crystallization occurs, is a measure of the concentration of dissolved solids in the remaining liquid.

FIG. 8A is a top view of a cross section along the line VIIIA—VIIIA in FIG. 8. FIG. 8B shows a detail of FIG. 8A in side view. The cutting device, which in FIG. 8 was denoted with (809) is composed of a ring (821), which rotates with the axle (820) by the key (820'). This ring (821) carries blocks (822), provided with knives (823), which in their turn are provided with a cutting "beak" (824). Between the blocks and cutting knives we see in FIG. 8A the slots (810).

We claim:
1. Apparatus for the continuous freeze concentration of aqueous solutions comprising in combination:
(a) enclosure means defining a cylindrical crystallization zone;
(b) a rotatable axle coaxial with the crystallization zone mentioned under (a);
(c) a plurality of cooling trays within the crystallization zone mentioned under (a), distributed at preselected distances along the axle mentioned under (b), and substantially perpendicular to that axle, said cooling trays extending in radial direction from the inner wall of the enclosure means mentioned under (a) to the axle, such as to divide the crystallization zone, mentioned under (a) in a number of cooling compartments;
(d) wiper means, adapted to cooperate with and wipe the surface of the cooling trays, mentioned under (c);
(e) means to separate the ice crystals of each of the cooling compartments, mentioned under (c) from liquid in that compartment;
(f) means belonging to each cooling compartment to separate the ice crystals of the second and additional cooling compartments from liquid and pass said ice crystals to the proceding compartment;
(g) means to pass liquid obtained from the second to the penultimum separating means mentioned under (f) to the succeeding cooling compartment;
(h) means to separate the ice crystals of the first cooling compartment from liquid and feed out said ice crystals;
(i) means to pass liquid obtained from the first separating means mentioned under (h) to the second cooling compartment;
(j) means to feed in the aqueous solution in the first cooling compartment;
(k) means to recover liquid obtained from the last separating means as a product.

* * * * *

UNITED STATES PATENT AND TRADEMARK OFFICE
CERTIFICATE OF CORRECTION

PATENT NO. : 4,188,797

DATED : February 19, 1980

INVENTOR(S) : Thijssen et al

It is certified that error appears in the above—identified patent and that said Letters Patent is hereby corrected as shown below:

Please change the spelling of the Assignee to read as follows:

--Douwe Egberts Koninklijke Tabaksfabriek-Koffiebranderijen en Theehandel B.V.--

Signed and Sealed this

Fourteenth Day of October 1980

[SEAL]

Attest:

SIDNEY A. DIAMOND

Attesting Officer

Commissioner of Patents and Trademarks